United States Patent
Matsuo et al.

(10) Patent No.: US 8,379,334 B2
(45) Date of Patent: Feb. 19, 2013

(54) LENS DRIVING DEVICE AND CAMERA UNIT

(75) Inventors: Takashi Matsuo, Suita (JP); Akira Kosaka, Yao (JP); Yasutaka Tanimura, Nara (JP); Natsuki Yamamoto, Kawasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 141 days.

(21) Appl. No.: 12/999,506

(22) PCT Filed: Jun. 5, 2009

(86) PCT No.: PCT/JP2009/060368
§ 371 (c)(1),
(2), (4) Date: Dec. 16, 2010

(87) PCT Pub. No.: WO2009/154090
PCT Pub. Date: Dec. 23, 2009

(65) Prior Publication Data
US 2011/0096419 A1    Apr. 28, 2011

(30) Foreign Application Priority Data
Jun. 17, 2008 (JP) .................................. 2008-157760

(51) Int. Cl.
*G02B 7/02* (2006.01)
(52) U.S. Cl. .................... 359/820; 359/819; 359/824
(58) Field of Classification Search .......... 359/694–704, 359/811–830
See application file for complete search history.

(56) References Cited

U.S. PATENT DOCUMENTS

| | | | |
|---|---|---|---|
| 4,525,745 A | 6/1985 | Ghaem-Maghami et al. | |
| 7,068,348 B2 * | 6/2006 | Hara | 355/30 |
| 7,265,917 B2 * | 9/2007 | Kugler et al. | 359/813 |
| 2004/0210108 A1 | 10/2004 | Shimizu et al. | 600/112 |
| 2007/0236810 A1 | 10/2007 | Masui et al. | |
| 2009/0076332 A1 * | 3/2009 | Iwasaki et al. | 600/168 |

FOREIGN PATENT DOCUMENTS

| | | |
|---|---|---|
| JP | 61-159029 | 7/1986 |
| JP | 62-042091 | 2/1987 |

(Continued)

OTHER PUBLICATIONS

English Translation of an Office Action issued on May 29, 2012 in the corresponding Japanese Patent Application No. 2010-517845.

(Continued)

*Primary Examiner* — Mohammed Hasan
(74) *Attorney, Agent, or Firm* — Cozen O'Connor (57) ABSTRACT

A biasing spring is interposed between a coupling plate and a covering section while being compressed from its natural length. The biasing spring biases, by its resilient force, a lens unit toward a −Z side to bring a surface of the lens unit at the −Z side into contact with an abutment portion of a fixing frame section. When a temperature of an actuator is equal to or lower than a predetermined temperature, a biasing force of the biasing spring surpasses a force generated in the actuator, and thus the lens unit is not moved. When the actuator is heated up to a temperature equal to or higher than the predetermined temperature, the lens unit is continuously moved in the +Z direction. Thereby, movement of a lens due to a change of an environmental temperature can be prevented.

19 Claims, 11 Drawing Sheets

FOREIGN PATENT DOCUMENTS

| | | |
|---|---|---|
| JP | 02-007882 A | 1/1990 |
| JP | 03-196781 A | 8/1991 |
| JP | 3-207841 | 9/1991 |
| JP | 2004-081231 A | 3/2004 |
| JP | 2004-333995 A | 11/2004 |
| JP | 2006-301202 A | 11/2006 |
| JP | 2006-340972 | 12/2006 |
| JP | 2007-193248 A | 8/2007 |
| WO | WO 2009/154090 A1 | 12/2009 |

OTHER PUBLICATIONS

Search Report issued on Jun. 11, 2012 in the corresponding European Patent Application No. 09 76 6538.4.

* cited by examiner

FIG. 14

LENS DRIVING DEVICE AND CAMERA UNIT

RELATED APPLICATIONS

This is a U.S. National Stage under 35 U.S.C. §371 of International Application No. PCT/JP2009/060368, filed with in the Japanese Patent Office on Jun. 5, 2009, which claims priority on Japanese Patent Application No. 2008-157760, filed Jun. 17, 2008.

TECHNICAL FIELD

The present invention relates to a lens driving device used for a micro camera unit (MCU) mounted in a mobile phone for example, for an optical pickup unit of an optical disc device, and the like.

BACKGROUND ART

A small-size camera unit mounted in a mobile phone includes a lens driving mechanism for moving a lens, in order to realize an autofocus function and the like. As the lens driving mechanism for use in such a small-size camera unit, recently, a lens driving mechanism using a so-called bimetallic actuator has been developed. The bimetallic actuator has two metal layers having different coefficients of thermal expansion. By heating, the two metal layers are expanded with their amounts of expansion being different from each other, so that a free end is displaced relative to a fixed end.

The bimetallic actuator has a simple structure, and therefore can be easily downsized and thinned, and additionally a relatively large amount of displacement and a relatively large generated force can be obtained. Particularly, in a small-size bimetallic actuator, power consumption can be suppressed low, too. Thus, there is a great advantage of using the bimetallic actuator in a small size lens driving mechanism.

Conventional techniques for moving a lens of an optical apparatus by using the bimetallic actuator are disclosed in Patent Documents 1 and 2, for example.

PRIOR-ART DOCUMENTS

Patent Documents

Patent Document 1: Japanese Patent Application Laid-Open No. 2004-81231
Patent Document 2: Japanese Patent Application Laid-Open No. 2007-193248

DISCLOSURE OF THE INVENTION

Problems to be Solved by the Invention

However, since the bimetallic actuator continuously changes the amount of displacement and a generated force in accordance with a temperature change, when the bimetallic actuator is used in the lens driving mechanism, a lens movement due to a change of the environmental temperature becomes a problem. To be specific, there is a problem that even when the bimetallic actuator is not actively heated, the bimetallic actuator is deformed due to a change of the environmental temperature so that the lens is moved.

Such a problem may occur not only in the bimetallic actuator formed by laminating two metal layers, but also in a general actuator formed by laminating two layers having different coefficients of thermal expansion. Moreover, such a problem may occur not only in a lens driving device used in a camera unit for use in a mobile phone, but also in a general lens driving device for moving a lens of an optical apparatus.

The present invention has been accomplished in view of the circumstances described above, and an object of the present invention is to provide a lens driving device and a camera unit capable of preventing a lens from being moved due to a change of the environmental temperature.

Means for Solving the Problems

To solve the above-described problem, an invention according to a first aspect is a lens driving device which includes: a fixing section; an actuator having at least two layers whose coefficients of thermal expansion are different from each other, the actuator being deformed due to a temperature change so that an operating point thereof is displaced relative to one portion thereof fixed to the fixing section, the operating point being a portion other than the one portion; a lens which is directly or indirectly coupled to the operating point, and moved along with displacement of the operating point; and a regulation section which biases the lens in a direction opposite to a direction in which the lens is moved when a temperature rises, and thereby regulates a position of the lens to a predetermined position in a predetermined temperature range including an ambient temperature.

An invention according to a second aspect is the lens driving device according to the first aspect, wherein the regulation section includes: an abutment portion formed on the fixing section or on a member fixed to the fixing section; and a biasing section which biases the lens or a unit including the lens, to bring the lens or the unit including the lens into contact with the abutment portion.

An invention according to a third aspect is the lens driving device according to the second aspect, wherein the biasing section is a coiled spring.

An invention according to a fourth aspect is the lens driving device according to the second aspect, further including a pair of parallel leaf springs which elastically support the lens or the unit including the lens, wherein the biasing section biases the lens or the unit including the lens by the pair of parallel leaf springs.

An invention according to a fifth aspect is the lens driving device according to the first aspect, including a pair of the actuators having the same temperature-displacement characteristics and having the operating points thereof being displaced in directions opposite to each other by a temperature change, wherein, when the ambient temperature rises, one of the actuators biases the lens in a direction opposite to a direction in which the lens is moved by the other of the actuators, and thereby a position of the lens is regulated to a predetermined position in a predetermined temperature range including the ambient temperature.

An invention according to a sixth aspect is the lens driving device according to the fifth aspect, further including: a pair of heaters each provided to each of the pair of actuators; and an energization section which selectively energizes the pair of heaters.

An invention according to a seventh aspect is a camera unit including: a lens driving device according to the first aspect; and an image pickup sensor section which images a light introduced through the lens.

Effects of the Invention

According to the inventions defined in the first aspect to the seventh aspect, the lens driving device includes the regulation section which biases the lens in the direction opposite to the direction in which the lens is moved when the temperature rises, and thereby regulates the position of the lens to the predetermined position in the predetermined temperature range including the ambient temperature. Therefore, movement of the lens due to a change of an environmental temperature can be prevented.

Particularly, according to the invention defined in the second aspect, the regulation section includes the abutment portion formed on the fixing section or on the member fixed to the fixing section, and the biasing section which biases the lens or the unit including the lens, to bring the lens or the unit including the lens into contact with the abutment portion. Therefore, the position of the lens can be stably regulated to a position in contact with the abutment portion.

Particularly, according to the invention defined in the third aspect, the biasing section is a coiled spring. Therefore, a stable biasing force can be applied to the lens.

Particularly, according to the invention defined in the fourth aspect, the lens driving device further includes the pair of parallel leaf springs which elastically support the lens or the unit including the lens, and the biasing section biases the lens or the unit including the lens by the pair of parallel leaf springs. That is, the parallel leaf springs are used as the biasing section, and therefore it is not necessary to provide the biasing section separately from the parallel leaf springs, which can simplify the configuration of the lens driving device.

Particularly, according to the invention defined in the fifth aspect, the lens driving device includes the pair of actuators having the same temperature-displacement characteristics and having the operating points thereof being displaced in directions opposite to each other by a temperature change, and when the ambient temperature rises, one of the actuators biases the lens in the direction opposite to the direction in which the lens is moved by the other of the actuators, and thereby the position of the lens is regulated to the predetermined position in the predetermined temperature range including the ambient temperature. This can prevent the lens from being moved due to a change of the environmental temperature, without providing any abutment portion.

Particularly, according to the invention defined in the sixth aspect, the lens driving device further includes the pair of heaters each provided to each of the pair of actuators, and the energization section which selectively energizes the pair of heaters. Therefore, the lens can be moved in two directions with good responsiveness.

BEST MODE FOR CARRYING OUT THE INVENTION

Hereinafter, preferred embodiments of the present invention will be described with reference to the drawings. Among FIGS. 1 to 14 referred to in the following description, FIGS. 1 to 4B, FIGS. 6A and 6B, FIG. 7, and FIGS. 9 to 13 indicate a common XYZ orthogonal coordinate system in which a direction extending along an optical axis A of a camera unit 1 is defined as a Z-axis direction.

1. First Embodiment 1-1. Configuration of Mobile Phone

Figure 1:
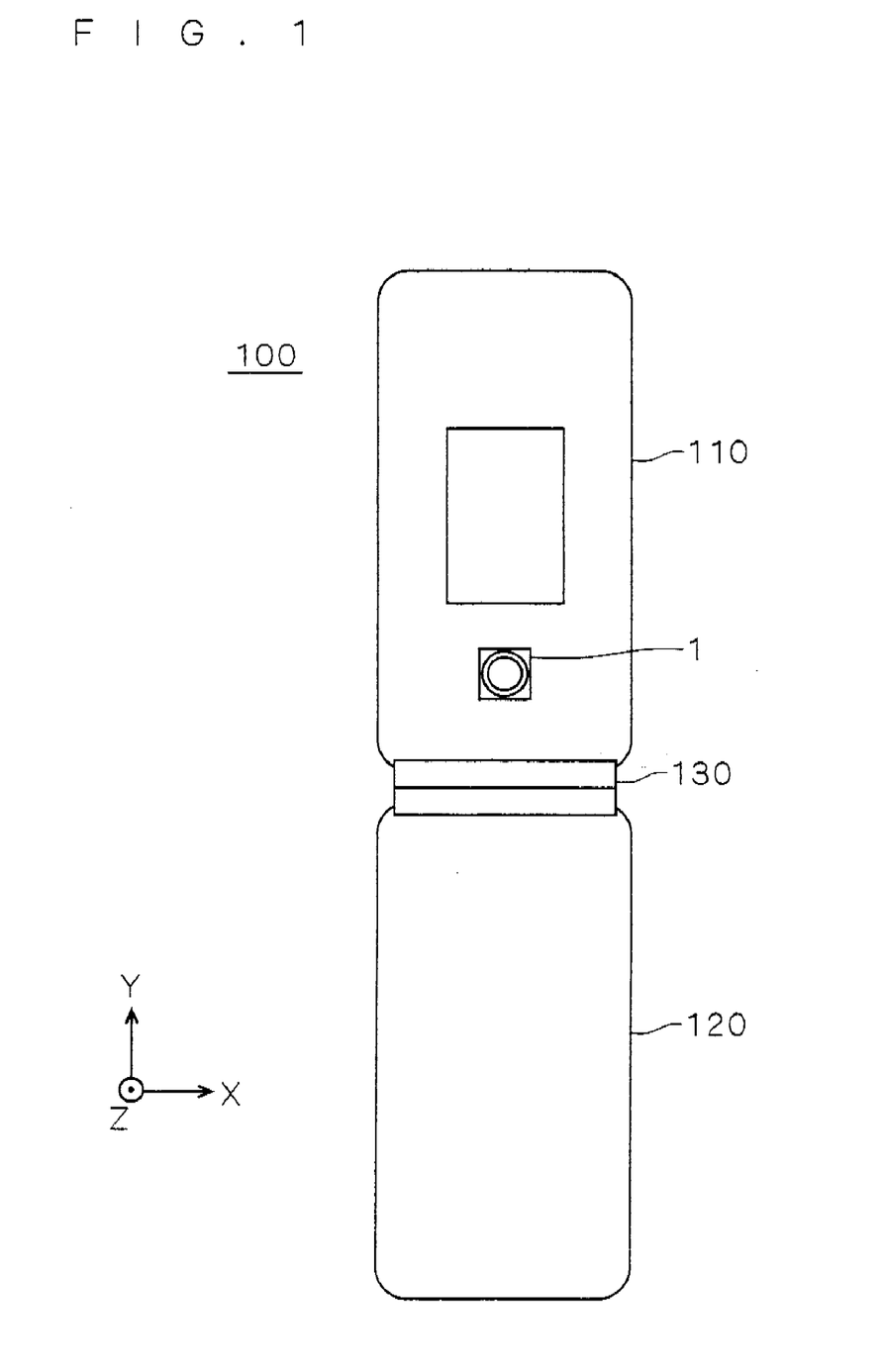
FIG. 1 shows an outline of a mobile phone in which a camera unit is mounted.

FIG. 1 shows an outline of a mobile phone 100 in which the camera unit 1 according to one embodiment of the present invention is mounted. As shown in FIG. 1, the mobile phone 100 mainly includes an image capturing/reproducing part 110 and a main body part 120. The image capturing/reproducing part 110 and the main body part 120 are coupled via a rotatable hinge part 130, and can be folded by the hinge part 130. The image capturing/reproducing part 110 has the camera unit 1 and a display part which is located at the back side in FIG. 1. The main body part 120 has various operation keys such as a numeric keypad, and a control part which controls a whole of the mobile phone 100.

Figure 2:
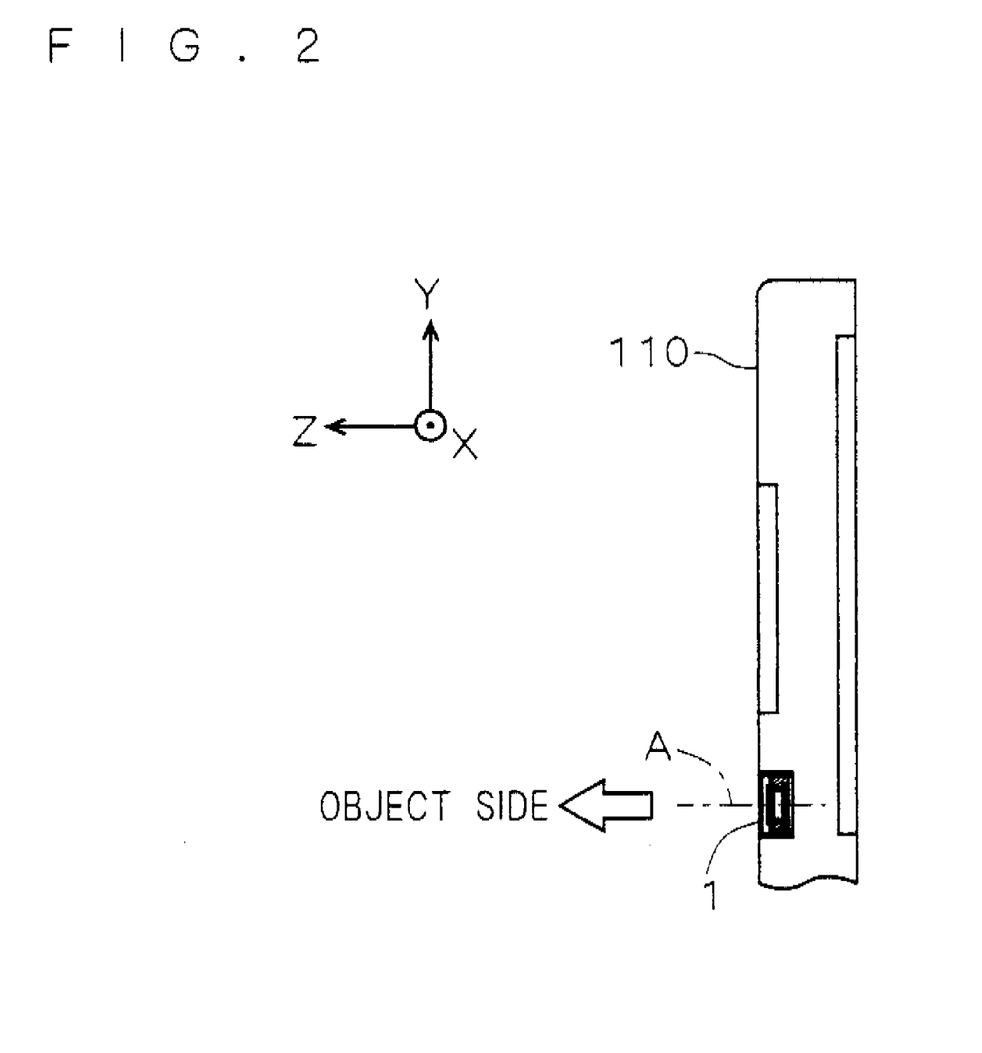
FIG. 2 is a cross-sectional view of a part of an image capturing/reproducing part.

FIG. 2 is a cross-sectional view of a part of the image capturing/reproducing part 110. As shown in FIG. 2, the camera unit 1 is assembled in the image capturing/reproducing part 110 in such a posture that an object side thereof faces outwardly of the image capturing/reproducing part 110 along the optical axis A thereof. The camera unit 1 is a small-size image pickup device whose XY cross-sectional size is approximately 5 mm square and whose thickness in the Z-axis direction is approximately 3 mm. That is, the camera unit 1 is a so-called micro camera unit (MCU).

1-2. Configuration of Camera Unit

Figure 3:
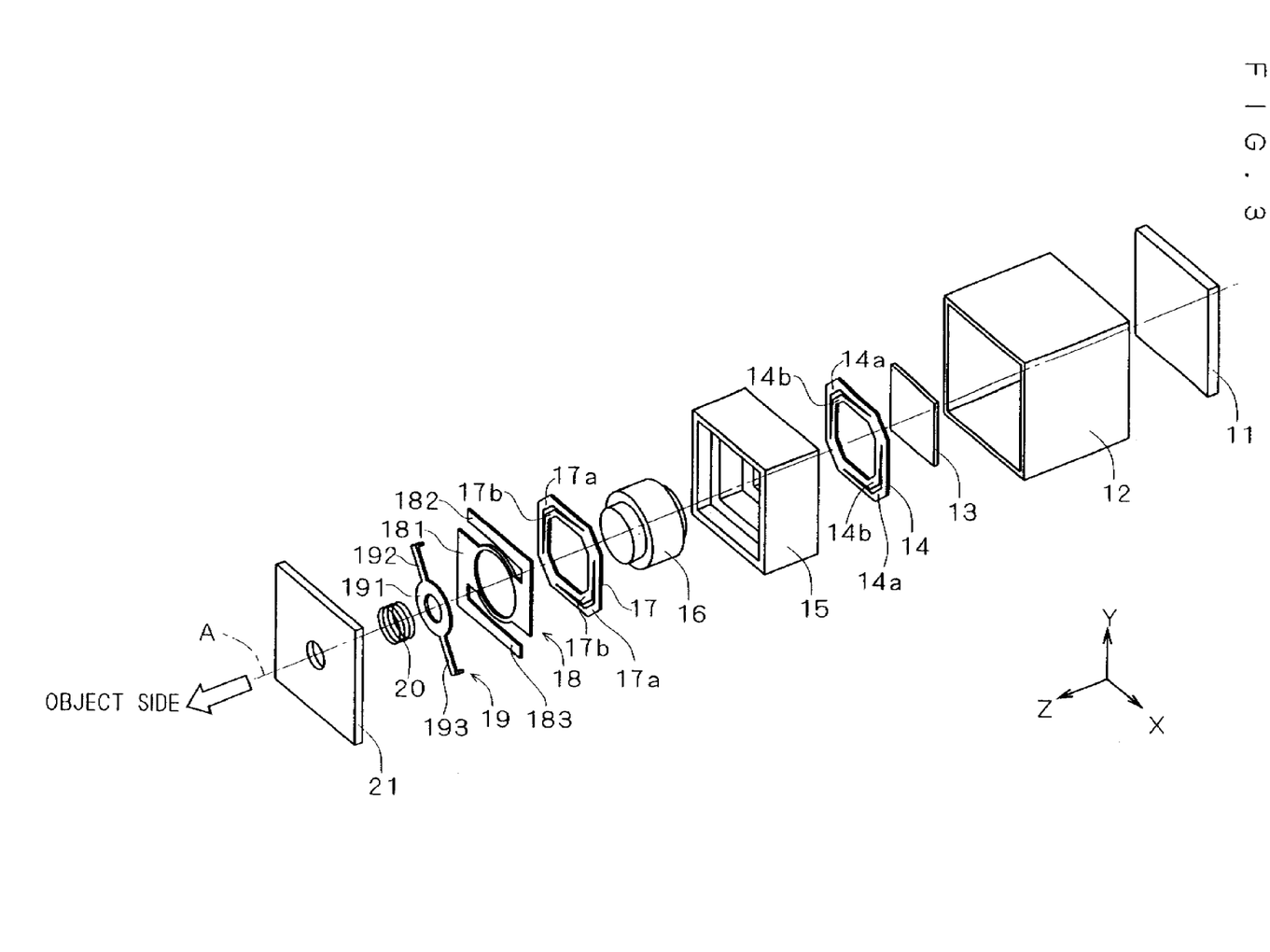
FIG. 3 is an exploded perspective view of the camera unit.
Figure 4A:
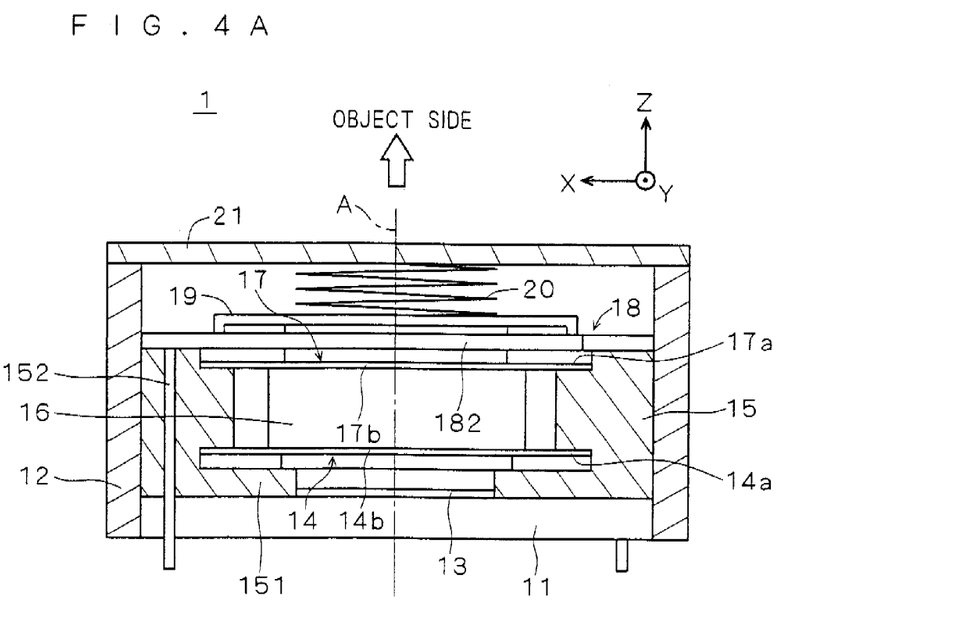
FIGS. 4A and 4B are cross-sectional views of the camera unit as sectioned along a plane including an optical axis.
Figure 4B:
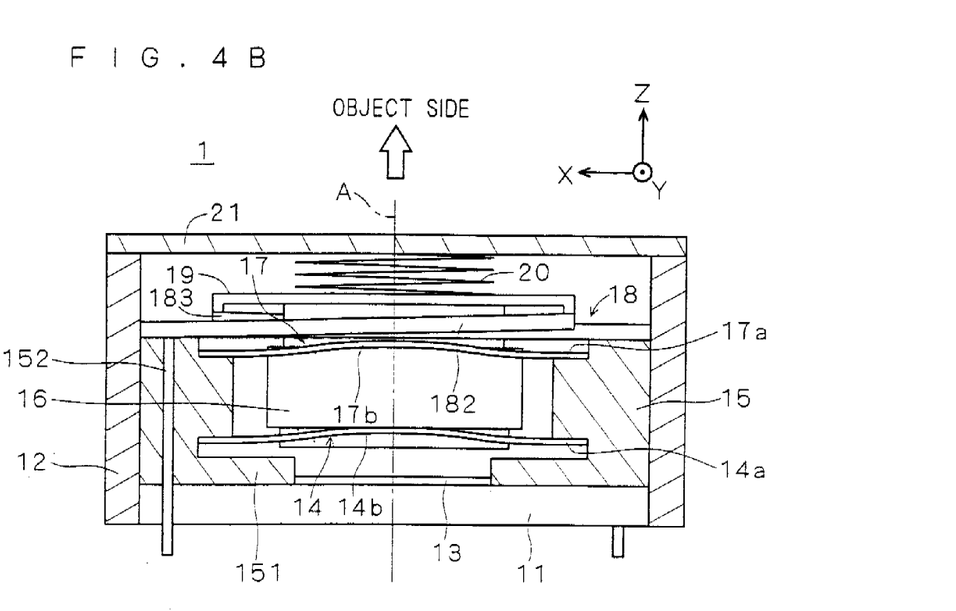

FIG. 3 is an exploded perspective view of the camera unit 1. FIGS. 4A and 4B are cross-sectional views of the camera unit 1 as sectioned along a plane including the optical axis A. As shown in FIG. 3 and FIGS. 4A and 4B, the camera unit 1 mainly includes an image pickup sensor section 11, an outer frame section 12, an infrared-cutting filter section 13, a first parallel leaf spring 14, a fixing frame section 15, a lens unit 16, a second parallel leaf spring 17, an actuator 18, a coupling plate 19, a biasing spring 20 and a covering section 21.

The image pickup sensor section 11 is a chip having an image pickup element (for example, a CMOS sensor or a CCD sensor) for imaging a light incident from the object side. Various terminals (not shown) for giving a drive signal to the image pickup sensor section 11 and for reading a detection signal from the image pickup sensor section 11 are provided on a back surface (surface at the −Z side) of the image pickup sensor section 11.

The outer frame section 12 is a substantially tubular member which accommodates the image pickup sensor section 11, the infrared-cutting filter section 13, the first parallel leaf spring 14, the fixing frame section 15, the lens unit 16, the second parallel leaf spring 17, the actuator 18, the coupling plate 19, and the biasing spring 20. The outer frame section 12 is formed of a resin, for example. As shown in FIGS. 4A and 4B, end portions of the outer frame section 12 at the +Z side and at the −Z side are sealed by the covering section 21 and the image pickup sensor section 11, respectively, and thereby an interior space of the outer frame section 12 is protected from dust and an external force.

The infrared-cutting filter section 13 is a chip having a filtering film which filters out an infrared ray incident from the object side. The infrared-cutting filter section 13 is formed by, for example, forming a plurality of thin films having different refractive indexes on an upper surface of a substrate made of a glass or a transparent resin, by sputtering or the like. The infrared-cutting filter section 13 serves to block a light in a specific wavelength band by using the thicknesses and the refractive indexes of the plurality of thin films.

The fixing frame section 15 is a substantially tubular member which fixes the first parallel leaf spring 14, the second parallel leaf spring 17, and the actuator 18, and regulates a positional relationship among them. The fixing frame section 15 is formed of a resin, for example. An outside surface of the fixing frame section 15 is fixed to an inside surface of the outer frame section 12 by an adhesive, for example. The first parallel leaf spring 14 and the second parallel leaf spring 17 are fixed to the inside of the fixing frame section 15, and the actuator 18 is fixed to an object-side surface of the fixing frame section 15.

An abutment portion 151 is formed at an end portion of the fixing frame section 15 at the −Z side. The abutment portion 151 protrudes inwardly (in a direction approaching the optical axis A), and a surface of the abutment portion 151 at the +Z side is in contact with a surface of the lens unit 16 at the −Z side. The abutment portion 151 is in contact with the surface of the lens unit 16 at the −Z side, and thereby serves to inhibit the lens unit 16 from getting closer to the image pickup sensor section 11 than a predetermined distance.

As shown in FIGS. 4A and 4B, a penetrating electrode 152 extending in the Z-axis direction is buried in the fixing frame section 15 by insert molding. An end of the penetrating electrode 152 at the −Z side is connected to an electrical wiring within the mobile phone 100 by a solder or the like. An end of the penetrating electrode 152 at the +Z side is connected to later-described heater layers 182b and 183b of the actuator 18 via later-described electrode pads 182e and 183e.

The first parallel leaf spring 14 and the second parallel leaf spring 17 form an elastic support section for supporting the lens unit 16 displaceably along the optical axis A. The first parallel leaf spring 14 and the second parallel leaf spring 17 have fixed portions 14a and 17a fixed to the fixing frame section 15, and moving portions 14b and 17b positioned inside the fixed portions 14a and 17a and fixed to the lens unit 16. Each of the first parallel leaf spring 14 and the second parallel leaf spring 17 is, for example, a single thin plate made of a metal (such as stainless, etc.) formed by press working or etching. The moving portions 14b and 17b are elastically displaceable relative to the fixed portions 14a and 17a. The fixed portions 14a and 17a are fixed to the inside of the fixing frame section 15 by an adhesive, for example. The moving portions 14b and 17b are fixed to an outside surface of the lens unit 16 by an adhesive, for example.

In FIG. 3, the first parallel leaf spring 14 and the second parallel leaf spring 17 are shaped such that the moving portions 14b and 17b are arranged obliquely, so that the fixed portions 14a and 17a and the moving portions 14b and 17b are positioned adjacent to each other. However, in FIGS. 4A and 4B, for clearly showing how the moving portions 14b and 17b move, the moving portions 14b and 17b are positioned at central portions of the first parallel leaf spring 14 and the second parallel leaf spring 17, respectively.

Figure 5A:
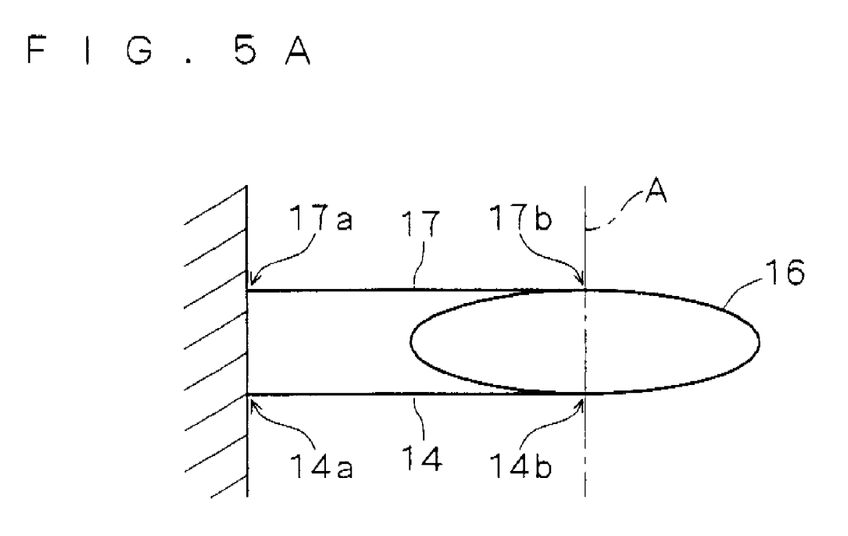
FIGS. 5A and 5B schematically show a function of first and second parallel leaf springs.
Figure 5B:
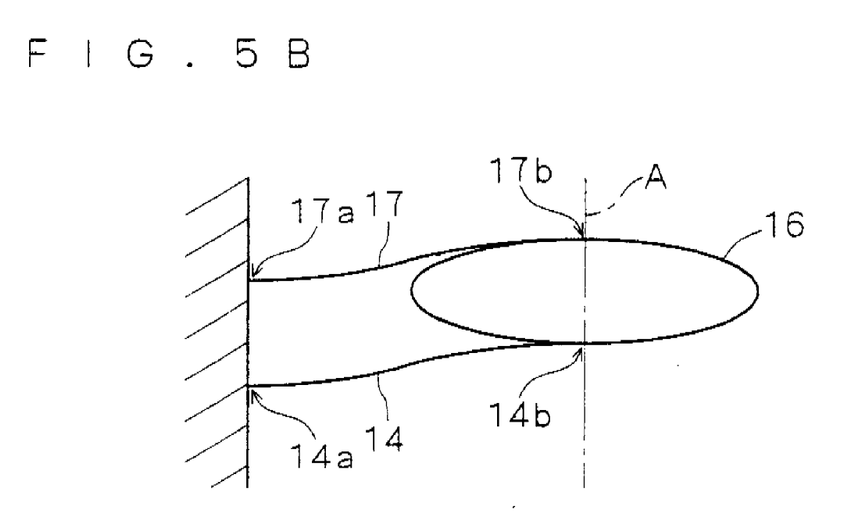

FIGS. 5A and 5B schematically show a function of the first parallel leaf spring 14 and the second parallel leaf spring 17. As shown in FIGS. 5A and 5B, the lens unit 16 is fixed to the moving portions 14b and 17b of the first parallel leaf spring 14 and the second parallel leaf spring 17, respectively. The first parallel leaf spring 14 and the second parallel leaf spring 17 constitute a so-called parallel linkage which deforms while maintaining a parallel state therebetween. Therefore, when a force in a direction along the optical axis A acts on the lens unit 16, the lens unit 16 is moved along the optical axis A without being inclined (a state shown in FIG. 5B).

Reference is made to FIG. 3 and FIGS. 4A and 4B again. The lens unit 16 is an optical unit having a plurality of lenses and a lens holder. The plurality of lenses held within the lens unit 16 are made of a transparent resin, a glass, or the like, and serve to form, on the image pickup sensor section 11, an image of a light incident from the object side. A protrusion protruding outwardly (in a direction away from the optical axis A) is formed on an outer circumferential surface of the lens unit 16. The moving portions 14b and 17b of the first parallel leaf spring 14 and the second parallel leaf spring 17, respectively, are fixed to surfaces of the protrusion at the −Z side and at the +Z side.

The actuator 18 is a member for moving the lens unit 16 by applying a force in the Z-axis direction to the lens unit 16. The actuator 18 has a fixed portion 181 and a pair of beam-like driving portions 182 and 183. The fixed portion 181 is fixed to the fixing frame section 15. The driving portions 182 and 183 are at the +Y side and at the −Y side of the fixed portion 181, and extend toward the −X side and the +X side, respectively. The fixed portion 181 is fixed to a surface of the fixing frame section 15 at the +Z side, by an adhesive, for example.

Figure 6A:
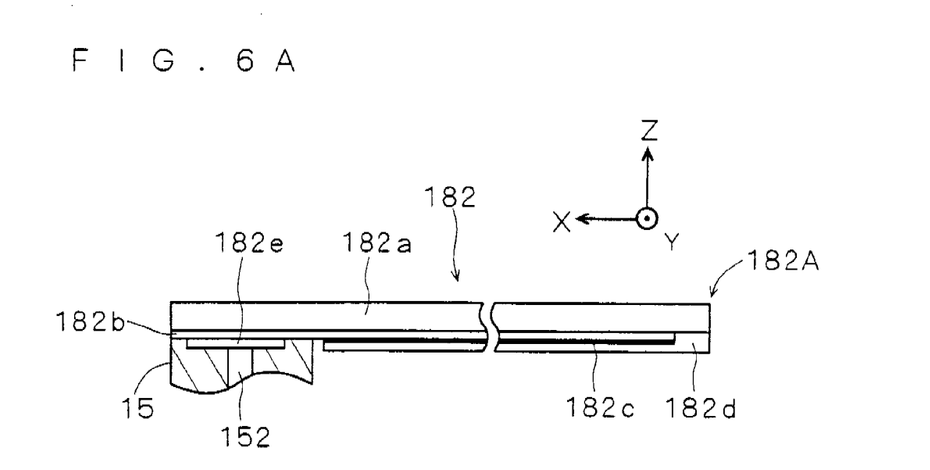
FIGS. 6A and 6B are cross-sectional views of a driving portion of an actuator.
Figure 6B:
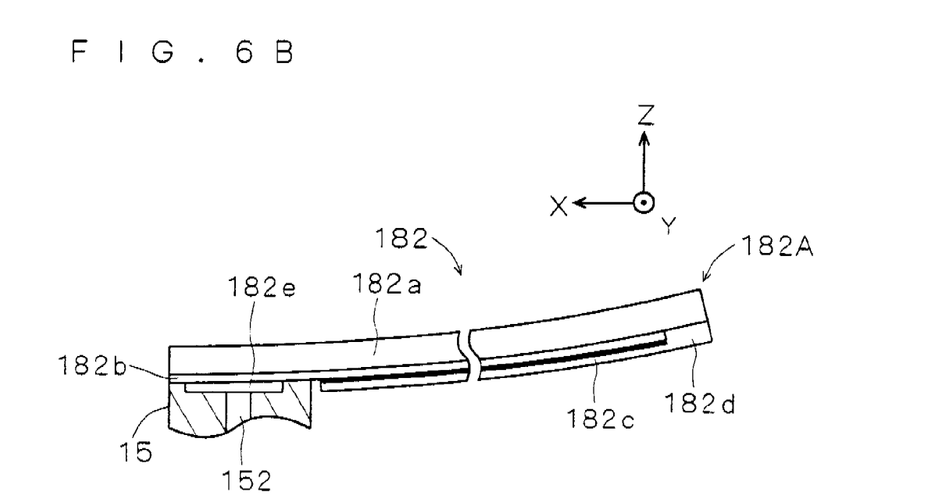

FIGS. 6A and 6B are cross-sectional views of the driving portion 182 of the actuator 18 as sectioned along a plane parallel to the XZ plane. As shown in FIGS. 6A and 6B, the driving portion 182 of the actuator 18 has a structure in which a silicon layer 182a, a heater layer 182b, an insulation layer 182c, and a metal layer 182d are laminated in the Z-axis direction.

The silicon layer 182a is a substrate having, as a main component, silicon which has a lower coefficient of thermal expansion than that of the metal layer 182d. The heater layer 182b is formed on a surface of the silicon layer 182a at the −Z side, by vapor deposition, sputtering, or the like. The heater layer 182b is made of a metal material such as platinum in which Joule heat is generated by energization. The insulation layer 182c is formed on a surface of the heater layer 182b at the −Z side, by CVD, sputtering, or the like. The insulation layer 182c is made of a material such as silicon dioxide ($SiO_2$) capable of providing electrical insulation between the heater layer 182b and the metal layer 182d.

The metal layer 182d is formed on a surface of the insulation layer 182c at the −Z side. The metal layer 182d is made of a material that provides easiness of manufacturing and has a larger coefficient of thermal expansion than that of the silicon layer 182a. Examples of the material include aluminum, nickel, or zinc. When aluminum is used, the metal layer 182*d* is formed at the −Z side of the insulation layer 182*c*, by vapor deposition or sputtering. When nickel or zinc is used, the metal layer 182*d* is formed at the −Z side of the insulation layer 182*c*, by vapor deposition, sputtering, or electroplating.

The penetrating electrode 152 in the fixing frame section 15 has its end at the +Z side connected to the heater layer 182*b* of the driving portion 182 via an electrode pad 182*e*. For making a stable contact between the penetrating electrode 152 and the electrode pad 182*e*, the penetrating electrode 152 and the electrode pad 182*e* are connected to each other by a solder or a conductive adhesive, for example.

When a voltage is applied to the heater layer 182*b* via the penetrating electrode 152, a current corresponding to a resistance value of the heater layer 182*b* flows in the heater layer 182*b*, and the heater layer 182*b* generates heat. The heat generated in the heater layer 182*b* is transferred to the silicon layer 182*a* and the metal layer 182*d*, to heat the silicon layer 182*a* and the metal layer 182*d*, respectively. Here, since the coefficient of thermal expansion of the metal layer 182*d* is larger than that of the silicon layer 182*a*, the metal layer 182*d* expands more largely than the silicon layer 182*a* does. As a result, as shown in FIG. 6B the driving portion 182 is bent, so that a distal end portion (operating point) 182A of the driving portion 182 is displaced toward the +Z side.

Although FIGS. 6A and 6B show a configuration of only one driving portion 182 of the actuator 18, a configuration of the other driving portion 183 of the actuator 18 is equivalent thereto.

Figure 7:
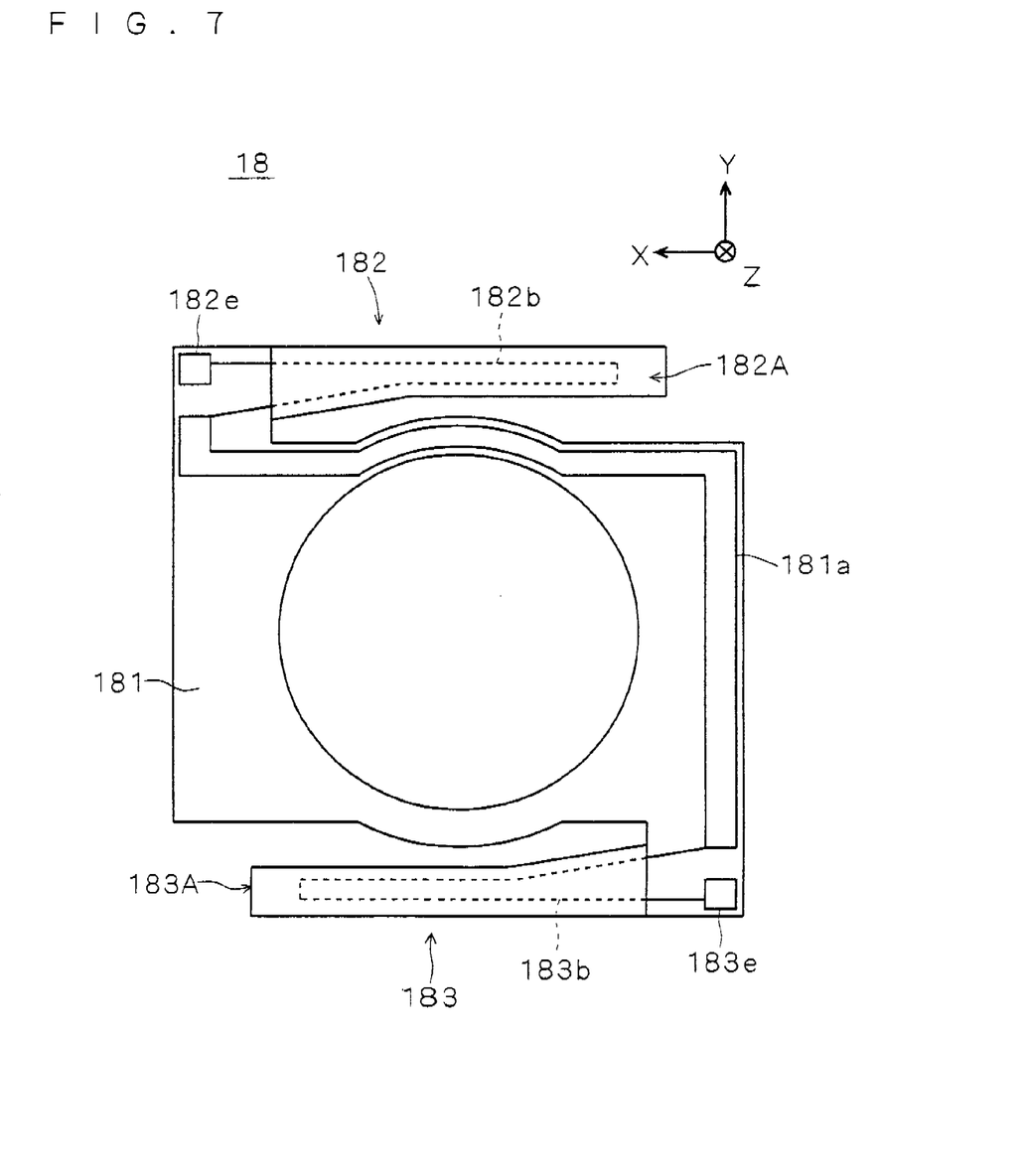
FIG. 7 shows the actuator as seen from an image pickup sensor side.

FIG. 7 shows the actuator 18 as seen from the −Z side. As shown in FIG. 7, the heater layer 182*b* of the driving portion 182 and the heater layer 183*b* of the driving portion 183 are electrically connected to each other, via a conductive portion 181*a* which is formed along a surface of the fixed portion 181 at the −Z side. The current given from the penetrating electrode 152 is sequentially supplied to the heater layers 182*b* and 183*b* of the two driving portions 182 and 183, so that heat is generated in the respective heater layers 182*b* and 183*b*.

The heat generation in the heater layers 182*b* and 183*b* bend the driving portions 182 and 183, and thus the heater layers 182*b* and 183*b* themselves are also bent as shown in FIG. 6B. At this time, a cross-sectional area (cross-sectional area along a YZ plane) of each of the heater layers 182*b* and 183*b* is reduced, and a current path of each of the heater layers 182*b* and 183*b* is extended. Therefore, an electrical resistance value of the heater layers 182*b* and 183*b* increases. A detector which detects such a variation of the electrical resistance value of the heater layers 182*b* and 183*b* is provided in a drive circuit (not shown) of the actuator 18. The drive circuit of the actuator 18 controls a current value of a current supplied to the heater layers 182*b* and 183*b*, while detecting the variation of the electrical resistance value of the heater layers 182*b* and 183*b*. Thereby, the drive circuit of the actuator 18 controls the amount of displacement of the distal end portions 182A and 183A of the driving portions 182 and 183.

For more successful detection of the deformation of the driving portions 182 and 183, it is desirable that the current paths of the heater layers 182*b* and 183*b* are long in lengthwise directions (X-axis direction) of the respective driving portions 182 and 183. For example, the current paths of the heater layers 182*b* and 183*b* may have folded shapes in which the current paths are folded back in portions near end portions of the respective driving portions 182 and 183 at the +X side and at the −X side.

Returning to FIG. 3 and FIGS. 4A and 4B, the coupling plate 19 is a relay member which couples the distal end portions 182A and 183A of the two driving portions 182 and 183 of the actuator 18 to the lens unit 16. The coupling plate 19 has a central portion 191 having a circular-plate shape and a pair of leg portions 192 and 193 extending from the central portion 191. The central portion 191 is fixed to a surface of the lens unit 16 at the +Z side. The pair of leg portions 192 and 193 are connected to the distal end portions 182A and 183A of the driving portions 182 and 183, respectively. Thus, when the pair of distal end portions 182A and 183A of the actuator 18 are displaced toward the +Z side, the coupling plate 19 and the lens unit 16 are integrally moved to the +Z side.

In order to obtain good displacement of the pair of distal end portions 182A and 183A while maintaining the connection between the pair of distal end portions 182A and 183A of the actuator 18 and the pair of leg portions 192 and 193 of the coupling plate 19, the pair of distal end portions 182A and 183A and the pair of leg portions 192 and 193 are connected by, for example elastic bonding using a silicon rubber. However, if the pair of leg portions 192 and 193 themselves are elastically deformable, the pair of distal end portions 182A and 183A and the pair of leg portions 192 and 193 may be connected to each other in a fixed manner.

The biasing spring 20 is a so-called coiled spring made of a metal wire having a helical shape. The biasing spring 20 is, while being compressed from its natural length, interposed between the coupling plate 19 and the covering section 21. Consequently, the biasing spring 20 biases the coupling plate 19, the pair of driving portions 182 and 183 of the actuator 18, and the lens unit 16 toward the −Z side, by the resilient force thereof. When a current equal to or greater than a predetermined value is not supplied to the actuator 18, the lens unit 16 has its surface at the −Z side brought into contact with the abutment portion 151 of the fixing frame section 15 by a biasing force of the biasing spring 20.

1-3. Operation of Camera Unit

The camera unit 1 performs an operation for moving the lens unit 16 to the most appropriate focus position when an autofocus is executed, or the like. In the following, the operation for moving the lens unit 16 will be described.

As described above, when the actuator 18 is not fed power, the lens unit 16 is pressed to the abutment portion 151 of the fixing frame section 15 by the biasing force of the biasing spring 20. That is, the lens unit 16 is at rest with its surface at the −Z side being in contact with the surface of the abutment portion 151 at the +Z side (the state shown in FIG. 4A).

To move the lens unit 16, a current is supplied through the penetrating electrode 152 to the respective heater layers 182*b* and 183*b* of the actuator 18. The heater layers 182*b* and 183*b* generate heat in accordance with a value of the supplied current, to heat the respective driving portions 182 and 183 of the actuator 18. When the driving portions 182 and 183 of the actuator 18 are heated to a temperature higher than a predetermined temperature, the driving portions 182 and 183 are deformed against the biasing force of the biasing spring 20, to integrally displace the coupling plate 19 and the lens unit 16 toward the +Z side (the state shown in FIG. 4B).

Figure 8:
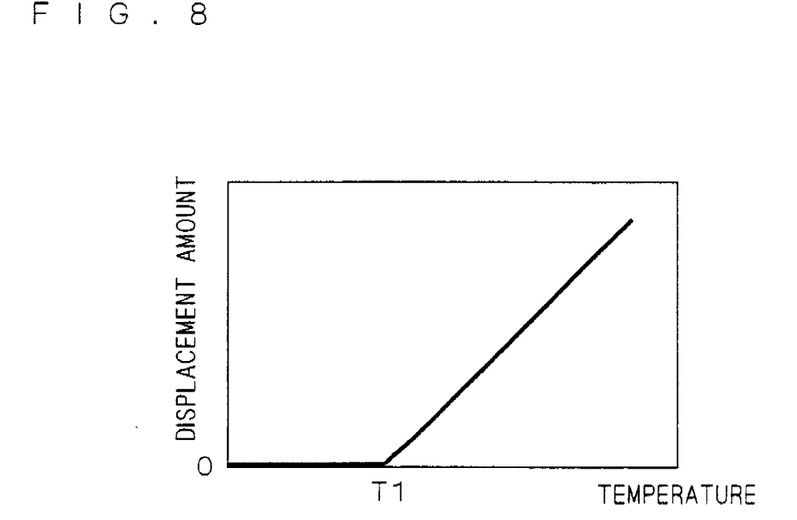
FIG. 8 schematically shows a relationship between a temperature of a pair of driving portions of the actuator and the amount of displacement of distal end portions of the driving portions.

FIG. 8 schematically shows a relationship between a temperature of the pair of driving portions 182 and 183 of the actuator 18 and the amount of displacement of the distal end portions 182A and 183A of the respective driving portions 182 and 183. As shown in FIG. 8, when the temperature of the driving portions 182 and 183 is equal to or lower than T1, the biasing force of the biasing spring 20 surpasses a resultant force of forces generated in the distal end portions 182A and 183A, and thus the distal end portions 182A and 183A of the driving portions 182 and 183 are not displaced. At this time, the lens unit 16 is at rest while being in contact with the abutment portion 151.

When the temperature of the driving portions 182 and 183 is higher than T1, the resultant force of the forces generated in the distal end portions 182A and 183A surpasses the biasing force of the biasing spring 20, and thus the distal end portions 182A and 183A of the driving portions 182 and 183 are continuously displaced toward the +Z in accordance with the temperature. This continuously moves the coupling plate 19 and the lens unit 16 toward the +Z side.

In this embodiment, a spring coefficient of the biasing spring 20 and displacement characteristics of the actuator 18 are set (selected) such that the temperature T1 can be higher than an upper limit value (for example, 60° C.) of the temperature of an operating environment of the camera unit 1. Accordingly, the distal end portions 182A and 183A of the driving portions 182 and 183 are not displaced due to a change of the environmental temperature. Thus, the lens unit 16 is also not moved due to the change of the environmental temperature. That is, the position of the lens unit 16 is regulated to a predetermined position, within a predetermined temperature range including an ambient temperature.

To perform an autofocus operation, a current is supplied to raise the temperature of each of the driving portions 182 and 183 of the actuator 18 up to T1 or higher, thereby firstly moving the lens unit 16 at the maximum (full stroke driving). Additionally, while the lens unit 16 is being moved, a focal position is determined based on a contrast or the like of an image picked up by the image pickup sensor section 11, to calculate the most appropriate focus position of the lens unit 16. The drive circuit of the actuator 18 feedback-controls the value of the current supplied to the heater layers 182b and 183b while referring to the resistance value of the heater layers 182b and 183b, and displaces the distal end portions 182A and 183A of the actuator 18 such that the lens unit 16 can be moved into the most appropriate focus position.

When the current supply to the actuator 18 is stopped after the imaging, the driving portions 182 and 183 are cooled so that the distal end portions 182A and 183A of the driving portions 182 and 183 return to positions where they are originally located before the displacement. Thus, the lens unit 16 also returns to a state (normal state) of being in contact with the abutment portion 151. In this embodiment, since the biasing force of the biasing spring 20 assist in the movement of the lens unit 16 toward the −Z side, the lens unit 16 can return to the normal state with high responsiveness.

In this embodiment, in the above-described camera unit 1, the lens driving device is made up of the first parallel leaf spring 14, the fixing frame section 15, the lens unit 16, the second parallel leaf spring 17, the actuator 18, the coupling plate 19, and the biasing spring 20. However, the lens driving device of the present invention is not limited to the one made up of such a group of members.

2. Second Embodiment

Figure 9:
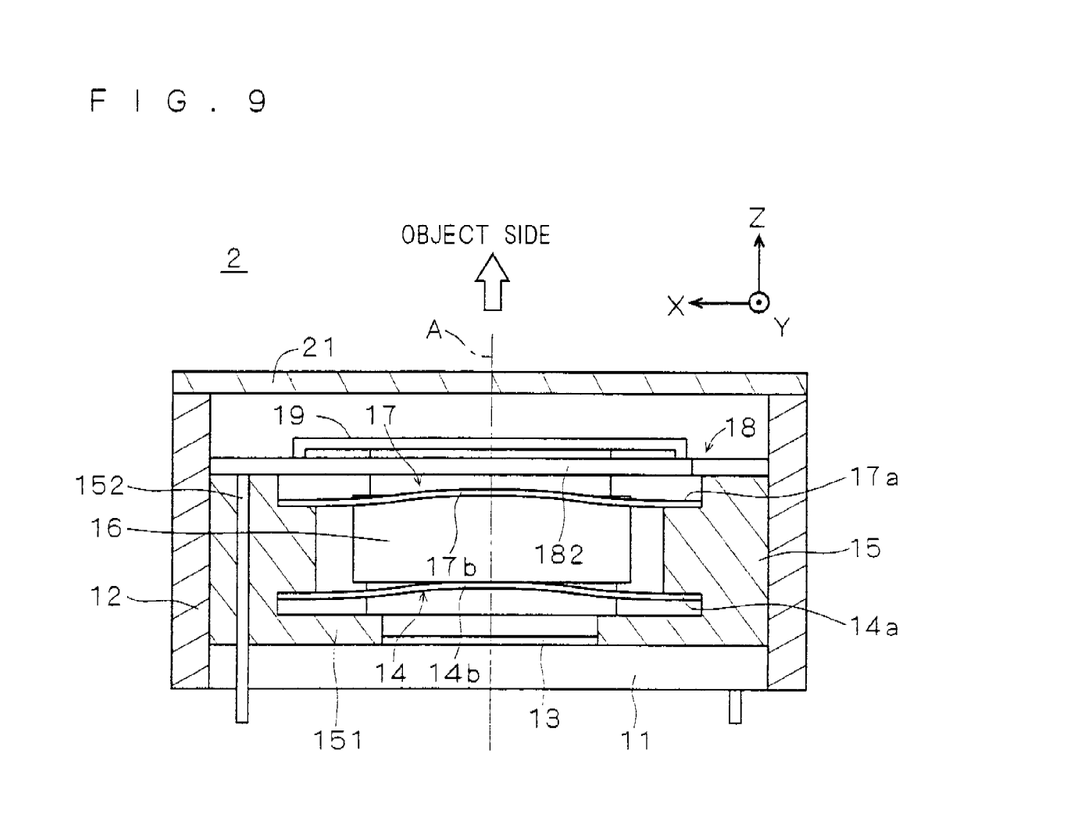
FIG. 9 is a cross-sectional view of a camera unit according to a second embodiment.

FIG. 9 is a cross-sectional view of a camera unit 2 according to a second embodiment of the present invention. The camera unit 2 of the second embodiment is different from the camera unit 1 of the first embodiment, in that the biasing spring 20 is not provided and that the first and second parallel leaf springs 14 and 17 are biased in advance. The other parts of the camera unit 2 of the second embodiment are substantially the same as those of the camera unit 1 of the first embodiment. Accordingly, in the following, points different from the first embodiment are mainly described. The parts in common with the first embodiment are denoted in FIG. 9 by the same reference numerals as those of the first embodiment, and an overlapping description will be omitted.

As shown in FIG. 9, in this embodiment, the moving portions 14b and 17b of the first and second parallel leaf springs 14 and 17 are fixed to the lens unit 16 while being displaced toward the +Z side. Thus, the moving portions 14b and 17b of the first and second parallel leaf springs 14 and 17 constantly bias the lens unit 16 to the −Z side by their resilient force. That is, in the camera unit 1 of this embodiment, the lens unit 16 is biased toward the −Z side by the first and second parallel leaf springs 14 and 17 instead of the biasing spring 20 of the first embodiment.

Therefore, when a current equal to or greater than a predetermined value is not supplied to the actuator 18, the lens unit 16 is pressed to the abutment portion 151 of the fixing frame section 15 by a biasing force of the first and second parallel leaf springs 14 and 17. That is, the lens unit 16 is at rest with its surface at the −Z side being in contact with the surface of the abutment portion 151 at the +Z side (the state shown in FIG. 9). A current equal to or greater than the predetermined value is supplied to the actuator 18 so that the driving portions 182 and 183 are heated up to a temperature higher than the predetermined temperature T1, the driving portions 182 and 183 are deformed against the biasing force of the first and second parallel leaf springs 14 and 17, to integrally displace the coupling plate 19 and the lens unit 16 toward the +Z side.

In this embodiment, since it is not necessary to provide the biasing spring 20 separately from the first and second parallel leaf springs 14 and 17, a configuration of the camera unit 2 can be simplified.

3. Third Embodiment

Figure 10:
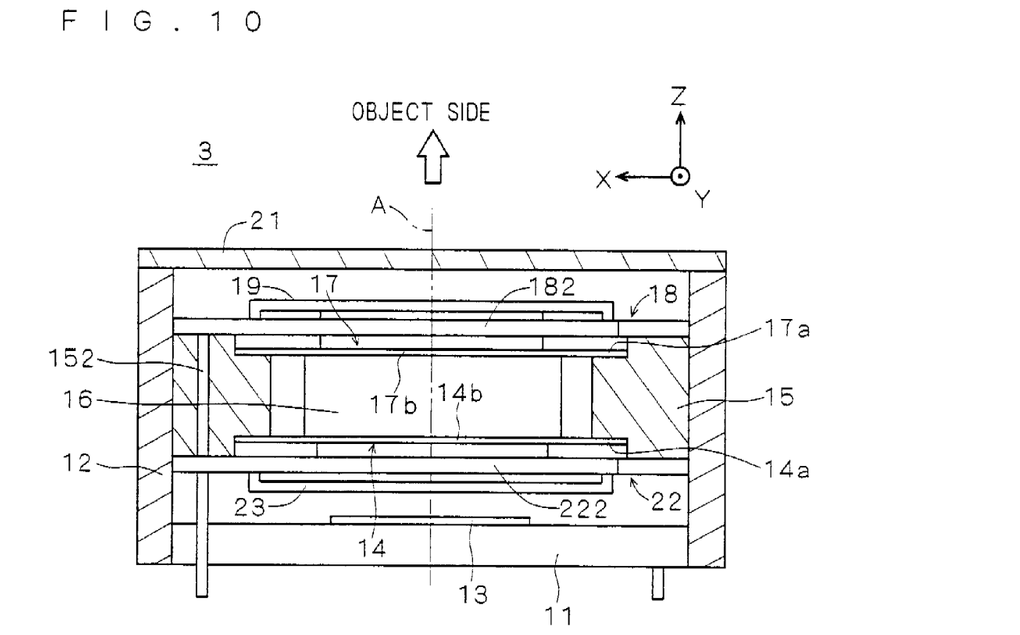
FIG. 10 is a cross-sectional view of a camera unit according to a third embodiment.

FIG. 10 is a cross-sectional view of a camera unit 3 according to a third embodiment of the present invention. The camera unit 3 of the third embodiment is different from the camera unit 1 of the first embodiment, in that the biasing spring 20 is not provided and that two actuators 18 and 22 and two coupling plates 19 and 23 are provided. The other parts of the camera unit 3 of the third embodiment are substantially the same as those of the camera unit 1 of the first embodiment. Accordingly, in the following, points different from the first embodiment are mainly described. The parts in common with the first embodiment are denoted in FIG. 10 by the same reference numerals as those of the first embodiment, and an overlapping description will be omitted.

As shown in FIG. 10, the camera unit 3 of this embodiment has the two actuators 18 and 22. The actuator 22 has a fixed portion 221 fixed to a surface of the fixing frame section 15 at the −Z side, and a pair of driving portions (only one driving portion 222 of which is shown in FIG. 10) fixed to the coupling plate 23. The pair of driving portions of the actuator 22 have the same temperature-displacement characteristics as those of the pair of driving portions 182 and 183 of the actuator 18, and when a temperature rises, the pair of driving portions of the actuator 22 are displaced in a direction (−Z side) opposite to the direction (+Z side) of displacement of the pair of driving portions 182 and 183 of the actuator 18.

In such a camera unit 3, when an environmental temperature rises, the actuator 18 and the actuator 22 exert the same force in directions opposite to each other. Thus, the lens unit 16 receives equal forces toward the +Z side and the −Z side from the two actuators 18 and 22, respectively, and balances so that the lens unit 16 maintains its resting state without moving. That is, in this embodiment, when the environmental temperature changes, one of the two actuators 18 and 22 biases a lens in a direction opposite to a direction in which the lens unit 16 is moved by the other actuator. Thereby, the position of the lens unit 16 is regulated.

To actively move the lens unit 16 toward the +Z side at a time of autofocus or the like, a current may be supplied only to the actuator 18. To actively return the lens unit 16 to the original position after imaging, the current supply to the actuator 18 may be stopped and a current may be supplied only to the actuator 22. It is not always necessary that a heater layer is provided in the actuator 22, but if a heater layer is provided, the lens unit 16 can be actively moved to the −Z side, too, which improves movement responsiveness of the lens unit 16.

4. Modification

In the above, the main embodiments of the present invention have been described. However, the present invention is not limited to the above-described embodiments.

Figure 11:
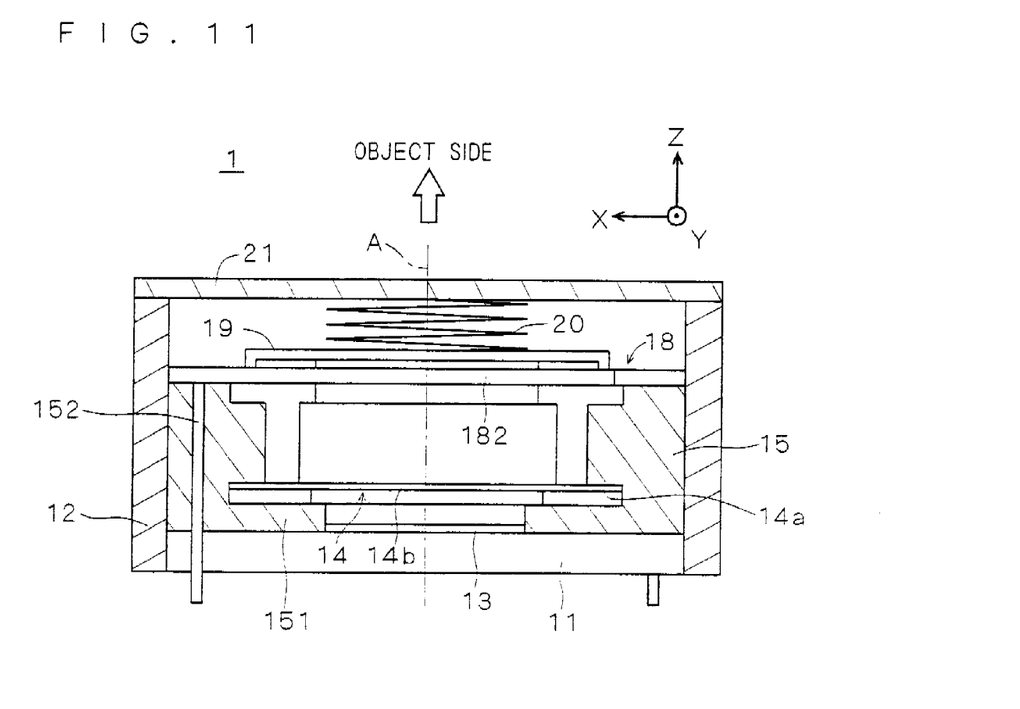
FIG. 11 is a cross-sectional view of a camera unit according to a modification.
Figure 12:
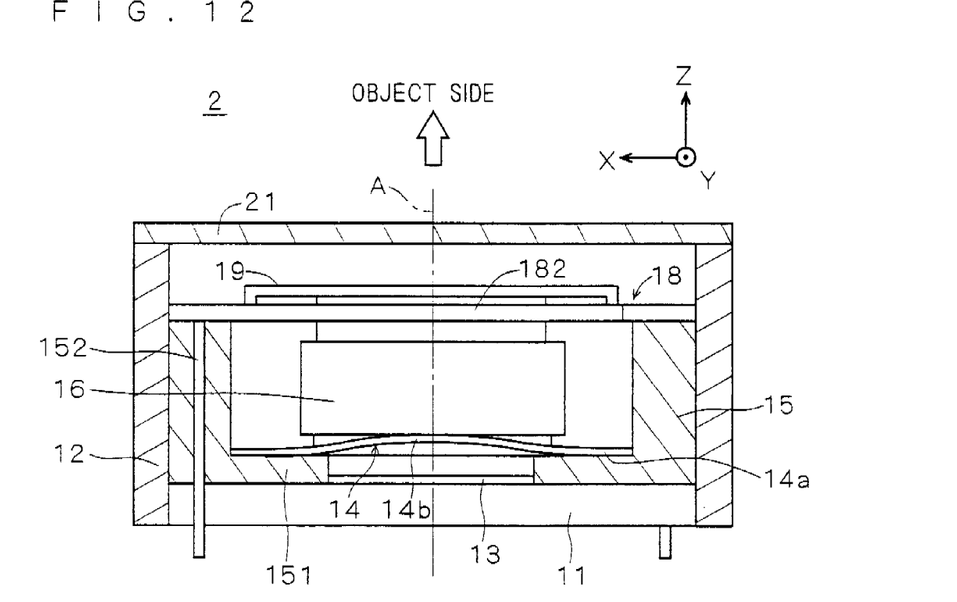
FIG. 12 is a cross-sectional view of a camera unit according to a modification.

In the embodiments described above, each of the camera units 1 to 3 has the pair of parallel leaf springs 14 and 17, thereby preventing the lens unit 16 from being inclined when moved in the Z-axis direction. However, only one of the parallel leaf springs 14 and 17 may be provided, so that inclination of the lens unit 16 can be prevented by one parallel leaf spring 14 (or 17) and the actuator 18. FIG. 11 and FIG. 12 are cross-sectional views showing cases where the parallel leaf spring 17 is removed in the camera unit 1 of the first embodiment and the camera unit 2 of the second embodiment, respectively.

Figure 13:
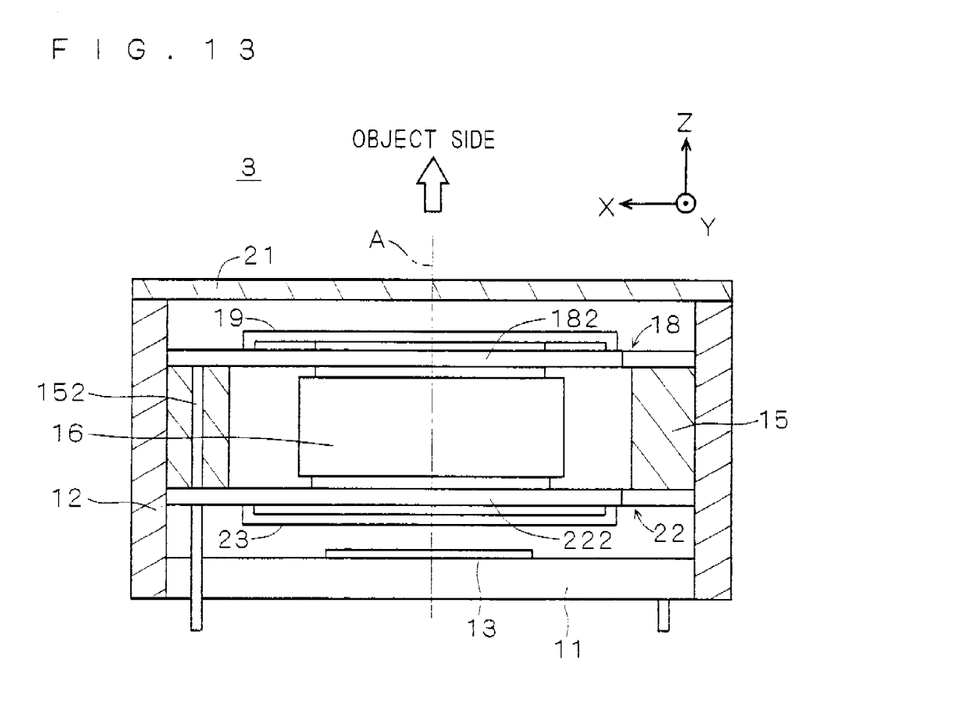
FIG. 13 is a cross-sectional view of a camera unit according to a modification.

Both of the parallel leaf springs 14 and 17 may be removed, and inclination of the lens unit 16 may be prevented only by the pair of actuators 18 and 22. FIG. 13 is a cross-sectional view showing a case where both of the parallel leaf springs 14 and 17 are removed in the camera unit 3 of the third embodiment. Removing one or both of the parallel leaf springs 14 and 17 as shown in FIG. 11 to FIG. 13 simplifies the structures of the camera units 1 to 3, thus reducing a manufacturing cost.

In the embodiments described above, the actuator 18 includes the silicon layer 182a and the metal layer 182d having different coefficients of thermal expansion. The actuator of the present invention may include two kinds of metal layers having different coefficients of thermal expansion. For example, the above-described silicon layer 182a may be replaced with a metal layer formed of a metal, such as invar (an alloy of iron and nickel), having a constant coefficient of thermal expansion. This enables adoption of a manufacturing method such as rolling, and thus the manufacturing cost can be reduced.

In the embodiments described above, the lens unit 16 is indirectly fixed to the pair of driving portions 182 and 183 of the actuator 18 via the coupling plate 19. However, the lens unit 16 may be directly fixed to the pair of driving portions 182 and 183 of the actuator 18.

In the embodiments described above, the lens unit 16 as a whole is moved in the Z-axis direction by the actuator 18, but a lens as a single body may be move in the Z-axis direction by the actuator 18.

In the embodiments described above, the lens unit 16 has been biased toward the −Z side, and at a time of autofocus, the lens unit 16 is moved toward the +Z side. However, it may be acceptable that the lens unit 16 has been biased toward the +Z side and at a time of autofocus, the lens unit 16 is moved toward the −Z side.

In the embodiments described above, the abutment portion 151 is formed on the fixing frame section 15, but the abutment portion 151 may be any portion as long as the position of the portion relative to the fixing frame section 15 to which the actuator 18 is fixed is not changed. Accordingly, for example, the abutment portion 151 may be formed on another member fixed to the fixing frame section 15.

In the embodiments described above, only when the lens unit 16 is to be moved, a current is supplied to the actuator 18. However, a standby current may be supplied to the actuator 18 at a time of no movement. If the pair of driving portions 182 and 183 of the actuator 18 are preheated to a temperature near the temperature T1 by the standby current, movement responsiveness of the actuator 18 can be improved.

In the embodiments described above, the temperature of the actuator 18 is controlled by the magnitude of the current supplied to the actuator 18. However, a pulse current may be given to the actuator 18, and the temperature of the actuator 18 may be controlled (duty control) by the wave number of the pulse current.

In the embodiments described above, the lens driving mechanisms mounted in the camera units 1 to 3 have been described, but similar lens driving mechanisms may be applied to an optical pickup unit of an optical disc device.

Figure 14:
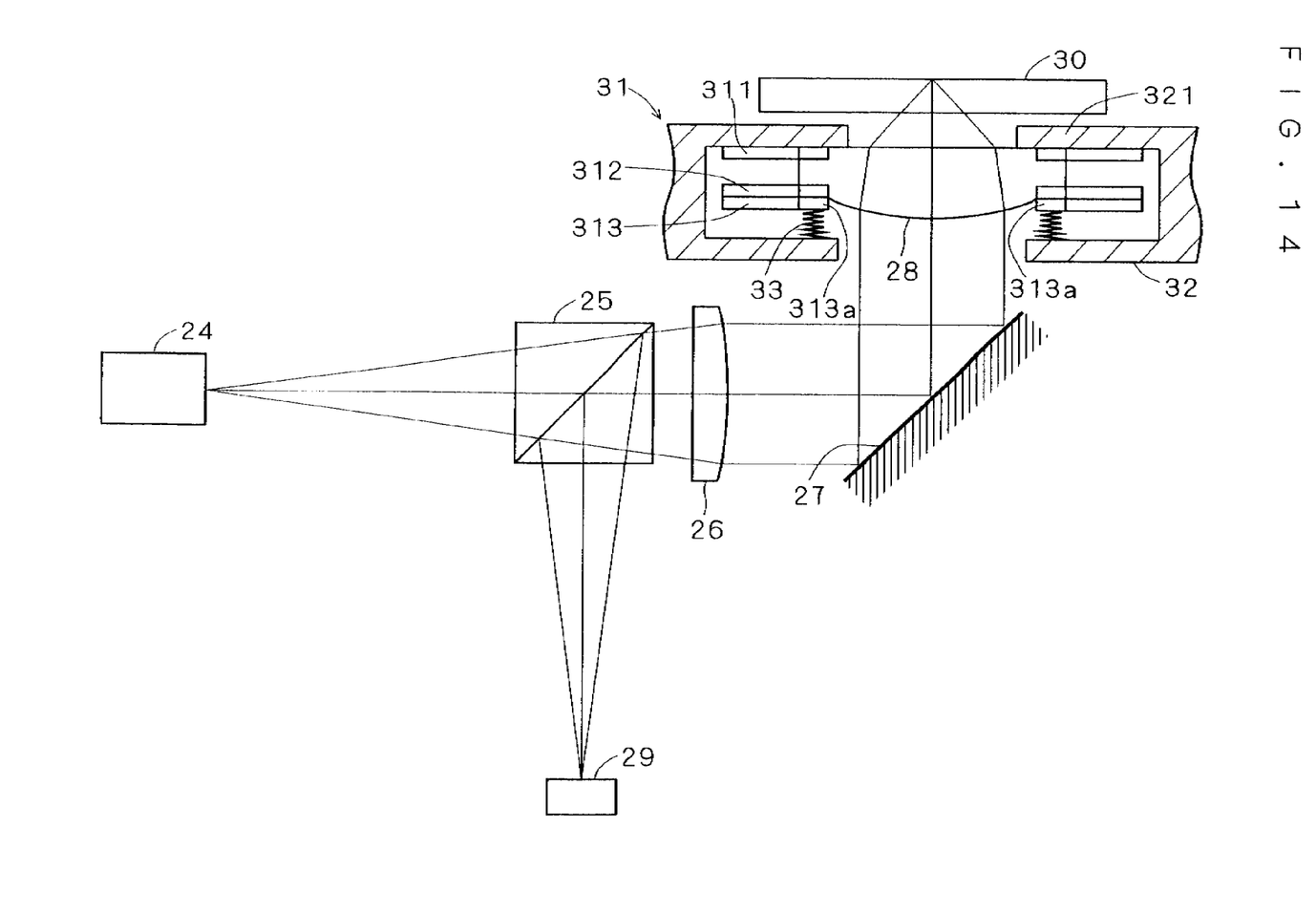
FIG. 14 shows an example of an optical pickup unit.

FIG. 14 shows an exemplary optical pickup unit to which the present invention is applied. The optical pickup unit of FIG. 14 mainly includes a light source 24, a beam splitter 25, a collimator lens 26, a reflecting prism 27, an objective lens 28, and a light-receiving element 29. A light beam emitted from the light source 24 passes through the beam splitter 25, and is converted into a parallel light by the collimator lens 26, and becomes incident on the reflecting prism 27. The light beam reflected by the reflecting prism 27 is converged and radiated to a recording surface of the optical disk 30 by the objective lens 28.

The optical pickup unit of FIG. 14 includes a lens driving mechanism 31 for moving the objective lens 28 in an optical axis direction. The lens driving mechanism 31 has a pair of parallel leaf springs 311 and 312 connected to the objective lens 28, and an actuator 313 which is deformed due to a temperature change. Additionally, between a driving portion 313a of the actuator 313 and a fixedly-installed frame 32, a biasing spring 33 is interposed while being compressed from its natural length. The biasing spring 33 biases the actuator 313 and the objective lens 28 in a direction opposite to a direction of displacement of the actuator 313, and brings the objective lens 28 into contact with an abutment portion 321 formed in the frame 32, thereby regulating the position of the objective lens 28. In this manner, movement of the objective lens 28 due to a change of the environmental temperature can be prevented.

DESCRIPTION OF REFERENCE NUMERALS 1-3 camera unit
11 image pickup sensor section
12 outer frame section
13 infrared-cutting filter section
14 first parallel leaf spring
15 fixing frame section
16 lens unit
17 second parallel leaf spring
18, 22, 313 actuator
19, 23 coupling plate
20 biasing spring
21 covering section
100 mobile phone
151 abutment portion
181, 221 fixed portion
182, 183, 222, 223, 313a driving portion
182A, 183A distal end portion
182a silicon layer
182b heater layer
182d metal layer
A optical axis

The invention claimed is:
1. A lens driving device comprising:
a fixing section;
an actuator having at least two layers whose coefficients of thermal expansion are different from each other, said actuator being deformed due to a temperature change so that an operating point thereof is displaced relative to one portion thereof fixed to said fixing section, said operating point being a portion other than said one portion;

a lens which is directly or indirectly coupled to said operating point, and moved along with displacement of said operating point; and a regulation section which biases said lens in a direction opposite to a direction in which said lens is moved when a temperature rises, and thereby regulates a position of said lens to a predetermined position in a predetermined temperature range including an ambient temperature.

2. The lens driving device according to claim 1, wherein said regulation section includes:

an abutment portion formed on said fixing section or on a member fixed to said fixing section; and a biasing section which biases said lens or a unit including said lens, to bring said lens or the unit including said lens into contact with said abutment portion.

3. The lens driving device according to claim 2, wherein said biasing section is a coiled spring.

4. The lens driving device according to claim 2, further comprising a pair of parallel leaf springs which elastically support said lens or the unit including said lens, wherein said biasing section biases said lens or the unit including said lens by said pair of parallel leaf springs.

5. The lens driving device according to claim 1, comprising a pair of said actuators having the same temperature-displacement characteristics and having said operating points thereof being displaced in directions opposite to each other by a temperature change, wherein, when the ambient temperature rises, one of said actuators biases said lens in a direction opposite to a direction in which said lens is moved by the other of said actuators, and thereby a position of said lens is regulated to a predetermined position in a predetermined temperature range including the ambient temperature.

6. The lens driving device according to claim 5, further comprising:

a pair of heaters each provided to each of said pair of actuators; and an energization section which selectively energizes said pair of heaters.

7. A camera unit comprising:

a lens driving device according to claim 1; and an image pickup sensor section which images a light introduced through said lens.

8. The camera unit according to claim 7, wherein the biasing force of said regulation section and displacement characteristics of said actuator are set such that, only when the temperature of said actuator exceeds a predetermined temperature higher than an upper limit value of a temperature of an operating environment of said lens driving device, said lens is moved against the biasing force of said regulation section in a direction in which said lens is moved when said temperature rises.

9. The camera unit according to claim 8, wherein said regulation section includes:

an abutment portion formed on said fixing section or on a member fixed to said fixing section; and a biasing section which biases said lens or a unit including said lens, to bring said lens or the unit including said lens into contact with said abutment portion.

10. The camera unit according to claim 9, wherein said biasing section is a coiled spring.

11. The camera unit according to claim 9, further comprising a pair of parallel leaf springs which elastically support said lens or the unit including said lens, wherein said biasing section biases said lens or the unit including said lens by said pair of parallel leaf springs.

12. The camera unit according to claim 8, comprising a pair of said actuators having the same temperature-displacement characteristics and having said operating points thereof being displaced in directions opposite to each other by a temperature change, wherein, when the ambient temperature rises, one of said actuators biases said lens in a direction opposite to a direction in which said lens is moved by the other of said actuators, and thereby a position of said lens is regulated to a predetermined position in a predetermined temperature range including the ambient temperature.

13. The camera unit according to claim 12, further comprising:

a pair of heaters each provided to each of said pair of actuators; and an energization section which selectively energizes said pair of heaters.

14. The lens driving device according to claim 1, wherein the biasing force of said regulation section and displacement characteristics of said actuator are set such that, only when the temperature of said actuator exceeds a predetermined temperature higher than an upper limit value of a temperature of an operating environment of said lens driving device, said lens is moved against the biasing force of said regulation section in a direction in which said lens is moved when said temperature rises.

15. The lens driving device according to claim 14, wherein said regulation section includes:

an abutment portion formed on said fixing section or on a member fixed to said fixing section; and a biasing section which biases said lens or a unit including said lens, to bring said lens or the unit including said lens into contact with said abutment portion.

16. The lens driving device according to claim 15, wherein said biasing section is a coiled spring.

17. The lens driving device according to claim 15, further comprising a pair of parallel leaf springs which elastically support said lens or the unit including said lens, wherein said biasing section biases said lens or the unit including said lens by said pair of parallel leaf springs.

18. The lens driving device according to claim 14, comprising a pair of said actuators having the same temperature-displacement characteristics and having said operating points thereof being displaced in directions opposite to each other by a temperature change, wherein, when the ambient temperature rises, one of said actuators biases said lens in a direction opposite to a direction in which said lens is moved by the other of said actuators, and thereby a position of said lens is regulated to a predetermined position in a predetermined temperature range including the ambient temperature.

19. The lens driving device according to claim 18, further comprising:

a pair of heaters each provided to each of said pair of actuators; and an energization section which selectively energizes said pair of heaters.

* * * * *